(12) United States Patent
Tunze et al.

(10) Patent No.: US 7,867,386 B2
(45) Date of Patent: Jan. 11, 2011

(54) PROTEIN SEPARATOR FOR AQUARIA

(75) Inventors: Axel Tunze, Penzberg (DE); Claude Hug, Horbourg Wihr (FR)

(73) Assignee: Tunze Aquarientechnik GmbH, Penzberg (DE)

( * ) Notice: Subject to any disclaimer, the term of this patent is extended or adjusted under 35 U.S.C. 154(b) by 841 days.

(21) Appl. No.: 11/796,141

(22) Filed: Apr. 26, 2007

(65) Prior Publication Data

US 2008/0011655 A1 Jan. 17, 2008

(30) Foreign Application Priority Data

May 9, 2006 (DE) .................. 20 2006 007 467 U

(51) Int. Cl.
*B01D 35/02* (2006.01)
*A01K 63/04* (2006.01)
(52) U.S. Cl. .................. 210/86; 210/110; 210/167.26; 119/259; 119/261
(58) Field of Classification Search ............. 210/86, 210/121–129, 101, 127, 167.21, 167.26, 210/188, 205, 512.1, 110, 538, 521; 119/259–261
See application file for complete search history.

(56) References Cited

U.S. PATENT DOCUMENTS

| | | | | | |
|---|---|---|---|---|---|
| 4,056,161 | A | * | 11/1977 | Allen, Jr. | 181/290 |
| 5,078,867 | A | * | 1/1992 | Danner | 210/167.22 |
| 5,122,267 | A | * | 6/1992 | Giovanetti et al. | 210/188 |
| 6,732,675 | B1 | * | 5/2004 | Liao | 119/259 |

* cited by examiner

*Primary Examiner*—Terry K Cecil
(74) *Attorney, Agent, or Firm*—Factor & Lake, Ltd.

(57) ABSTRACT

It is proposed to avoid an excessive formation of foam in the collection vessel of a protein separator by throttling the feed of air to a foam generator according to the foam generation rate in the separator. The foam generation rate in the separator can be measured by the amount of phase water that is separated in a second separator, which is located between the foam collection vessel and a first separator, in which second separator the mixture generated by the foam generator is freed from liquid constituents.

13 Claims, 3 Drawing Sheets

PROTEIN SEPARATOR FOR AQUARIA

RELATED APPLICATIONS

The present invention claims the benefit of the filing date of German Patent Application, Serial No. 20 2006 007 467.8, filed May 9, 2006; the content of which is incorporated by reference herein.

TECHNICAL FIELD

The present invention relates to a protein separator for aquaria, in particular sea water aquaria.

BACKGROUND OF THE INVENTION

Protein separators serve to extract from the water in the aquarium protein components that adversely affect the quality of the water and damage the environmental conditions for animals and plants living in the aquarium. The removal of the protein takes place in such a way that first of all a foam is generated by mixing air and protein-laden water. The foam can then be trapped in a collection vessel, which is emptied at relatively long intervals.

The protein contamination rate in aquaria is however not always constant. When organisms die or organic materials are introduced from outside, there may be a temporary severe overloading of the aquarium water with protein, which precipitates in the water, with the result that the foam generator of the separator then temporarily produces very large amounts of foam. For reasons of cost and to some extent also for reasons of space, which plays a role in aquaria installed in dwellings, the size of the protein separator may not be sufficient for the separator still to properly process the amount of foam formed also in the conceivably most unfavorable case. This may therefore cause an overflow of the collection vessel, which either necessitates the provision of an external trap tank, or leads to undesirable discharge of liquid into the surroundings of the protein separator.

The present invention is provided to solve these and other problems.

SUMMARY OF THE INVENTION

The object of the present invention is to avoid discharge of foam from the collection vessel due to too high a foam formation rate.

This object may be achieved according to the present invention wherein a protein separator for aquaria comprises a foam generator, which sucks in aquarium water and air and generates a water/air mixture; a first separator, which receives the water/air mixture at an inlet and breaks this down into a foam component, which is discharged at a foam outlet, and into an aqueous component, which is discharged at a water outlet; and, a foam collection vessel, which comprises an inlet connected to the foam outlet of the separator, such that an air control device is provided, which regulates the amount of air sucked in by the foam generator depending on the foam generation rate of the foam generator.

The invention can be characterised in broad terms by the fact that in the event of a protein overloading of the aquarium water the air feed to the foam generator is adjusted (throttled) so that overall only an amount of foam is obtained that the equipment can handle without any problems. The generation of smaller amounts of foam means that the foam has more time en route to the collection vessel to change from a wet foam to a dry foam. Overall less water is thus introduced into the collection vessel, and correspondingly more collection space is available for dry foam.

The reduced foam formation rate according to the invention achieved by adjusting the fed amount of mixed air means of course that the excess protein concentration in the aquarium water is reduced more slowly. This disadvantage is acceptable however in terms of the advantage that is gained, since over the long term it is ensured that the desired low protein concentrations are maintained.

An additional aspect of the present invention includes a second separator provided between the foam inlet of the collection vessel and the foam outlet of the first separator, which is in communication with a water chamber, and that the air control device operates depending on the level of the volume of water contained in the water collection chamber to ensure that the amount of foam leaving the first separator can be reliably determined in a simple way. Foam itself may for various reasons be less easily detected. The water that is separated from the wet foam in the second separator is however also a measure of the amount of foam discharged from the first separator. This so-called phase water can be measured very easily by using conventional detectors, including mechanical level sensors, optical level sensors or level electrodes.

Accordingly, the removal of the protein can be carried out such that firstly, a foam is generated by mixing air and protein-laden water, water is separated from this wet foam in a first separator, and the wet foam is converted into a dry foam in a second, downstream separator. The foam can be trapped in a space-saving manner in a collection vessel, which is emptied at relatively long intervals.

In another aspect of the present invention, the water collection chamber comprises an overflow opening, which at the same time forms a passage opening for air sucked in by the foam generator and provides that the water collection chamber is continuously emptied over the course of time. The volume of the chamber therefore need not be large. The phase water discharged from the water collection chamber is recycled to the interior of the aquarium or to a filter chamber enclosing the separator.

In a still further aspect of the present invention, the overflow opening has a diameter that is chosen with regard to the air and/or water conveying output of a pump of the foam generator, and further having regard to the capacity of the collection vessel, wherein the drop in the level of the phase water in the water chamber is chosen according to the capacity of the pump belonging to the foam generator.

In yet another aspect of the present invention, the overflow opening is arranged at a vertical position that lies above the upper edge of a water outlet part of the first separator such that a certain minimum volume of liquid is always contained in the water chamber. This volume is large enough so that the level of the phase water maintained in the water chamber is sufficient to produce a liquid seal at the inlet of the second separator. This can therefore be detachable from the first separator, but despite this can be connected in a foam-type manner to the outlet of the first separator without a separate seal having to be provided.

In yet a still further aspect of the present invention, an air discharge opening of the water collection chamber is arranged above the overflow opening to facilitate the suction of air through the foam generator takes place from the water chamber. This means on the one hand that practically saturated air is sucked in, and on the other hand that also a slight reduced pressure is established in the water chamber. The wet foam conveyed through the water chamber is also exposed to this reduced pressure, which promotes the bursting of relatively unstable bubbles and thus the drying of the foam. Also, the water discharge opening, through which air is sucked in from the surroundings, can at the same time serve as a control valve. If in the case of a raised phase water level the water discharge opening is partially or completely closed, then the access of air from the surroundings is throttled.

Yet another aspect of the present invention further includes a level sensor operatively connected to the collection vessel or a water chamber of a second separator connected downstream of the first separator, and the air control device operates depending on the output signal of this level sensor to ensure that the collection vessel is not excessively filled with foam to such an extent that it overflows.

In yet a still further aspect of the present invention, the design of the second separator includes a tubular part of constant cross section preferably a cylindrical tubular part— which is guided from an upper section of the first separator into the interior of the collection vessel and is particularly advantageous in terms of a mechanically simple realisation.

In yet another further aspect of the present invention, a conducting body is operatively connected at the lower end of the tubular part and tapers in the direction from the first separator to the second separator such that the wet foam discharged from the first separator is conveyed in a flow-favourable manner to the second separator.

According to another aspect of the present invention, the tubular part terminates at an axial distance above the conducting body that is small compared to the mean diameter of the tubular part and is comparable to the radial distance between the tubular part and the upper end of the conducting body and is accordingly advantageous with regard to a good feed of phase water separated in the second separator to the water chamber, whereby it is ensured at the same time that only a small amount of foam passes from the inlet of the second separator to the water chamber.

According to yet another aspect of the present invention, an annular gap between the conducting body and tube part of the second separator, wherein the axial distance between the conducting body and the tubular part is about 1-2 mm, has proved particularly advantageous in practice.

According to a still further aspect of the present invention, an adjustable servovalve is arranged in the suction path of the foam generator, which valve is set, depending on the output signal of a level sensor arranged in the water collection chamber of a second separator connected downstream of the first separator, in such a way that the air throughput is reduced if the level rises, and is increased if the level falls; thus providing a mechanism to control the amount of air sucked in by the foam generator in a very precise and continuous manner, so that the nominal throughput of the second separator is well utilised but is not exceeded.

According to yet a still further aspect of the present invention, a direct flow connection between the water outlet and the mixture inlet of the first separator is interrupted by a separating device to ensure that no foam fed to the first separator directly reaches the water outlet of the first separator.

In yet another aspect of the present invention, a vertical outlet part of the first separator is at a height that is above the normal level (N) of the surrounding water to ensure that the upper end of the vertical outlet part of the first separator is sufficiently low such that no water is forced directly into the water chamber due to the hydrostatic pressure in the first separator.

In still a further aspect of the present invention, the outside of the vertical outlet part carries a foam material sleeve that is advantageous in regard to maintaining a low noise level of the protein separator, since the water flowing back from the upper end of the vertical outlet connection piece into the aquarium or into the filter chamber is slowed down by the foam material.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

The invention is explained in greater detail below by means of exemplary embodiments with reference to drawings in which.

DETAILED DESCRIPTION OF THE INVENTION

Figure 1:
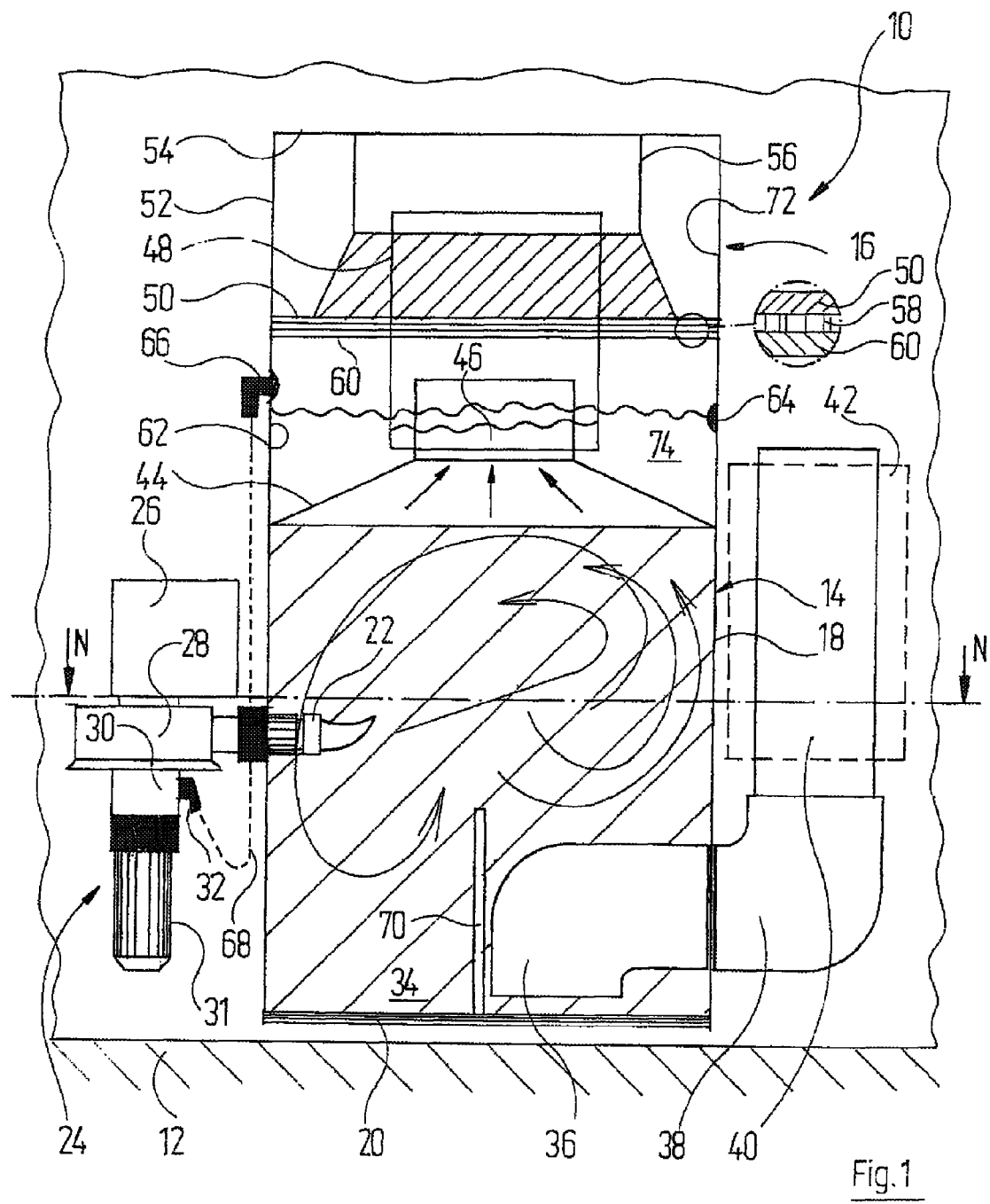
FIG. 1: is a diagrammatic axial section through a first embodiment of a protein separator with automatic restriction of the foam level in the foam collection vessel.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIG. 1 a protein separator is denoted overall by the reference numeral 10, which is arranged in the interior of an only partly shown outer vessel 12. The outer vessel may be an aquarium vessel or a filter chamber arranged in a lower cabinet underneath an aquarium vessel.

The protein separator 10 has a main part identified overall by the reference numeral 14, as well as an upper part 16 mounted on the latter.

The main part 14 has a cylindrical circumferential wall 18 that is closed at the bottom by a floor wall 20.

In the circumferential wall 18 an opening is provided, into which is tightly inserted a discharge connection piece 22 of a foam generator identified overall by the reference numeral 24.

The foam generator 24 comprises a centrifugal pump 28 driven by an electric motor 26, the outlet of the pump being connected to the discharge connection piece 22 and comprising an inlet connection piece 30 that is in communication with a slotted body 31. The inlet connection piece 30 carries in addition an air inlet connection piece 32.

The foam generator 24 operates so that it sucks in protein-laden water from the interior of the outer vessel 12 and at the same time sucks in air through the air inlet connection piece 32. A foam is thus generated in the centrifugal pump 28, which is discharged via the discharge connection piece 22 into the interior of the main part 14.

This foam discharged into the main part 14 still contains in addition liquid fractions, for the foaming of which the protein content of the water was not sufficient.

The discharge connection piece 22 terminates tangentially in the circumferential wall 18, so that the water/foam mixture on entering the main part 14 is caused to rotate. The circumferential wall 18 of the main part 14 thus forms a cyclone, which separates the heavy, unfoamed aqueous fractions of the mixture from the foam fractions.

The aqueous fractions sink to the bottom of the main part 14 under the force of gravity and form a volume of water 34 over the floor wall 20.

A suction angle piece 36 projects into the lower section of the main part 14, and terminates with its lower open side at a slight distance above the upper side of the floor wall 20. In practice the distance between the lower edge of the suction angle piece and the upper side of the floor wall may be 2 to 4 mm.

A section of reduced diameter of the suction angle piece 36 passes through the circumferential wall 18 and is tightly connected to a deflection angle piece 38, which carries at the other, in FIG. 1 the upper end, a discharge pipe 40. A cylindrical foam material sleeve 42 is arranged on the outside of the discharge pipe 40.

The foam fractions separated from the aqueous components in the main part 14 rise upwardly in the main part 14 and reach the lower side of a conducting body 44, which has the shape of a truncated cone of large aperture angle. The upper edge of the conducting body 44 carries a cylindrical piece 46.

The conducting body 44 is surrounded by a separating tube 48 at a radial and roughly constant axial distance, which is held by the upper part 16. The aforementioned distance may in practice be 1 to 2 mm.

The upper part 16 has a floor wall 50, which carries the separating tube 48, and also a circumferential wall 52 as well as a cover 54. The latter carries a cylindrical, downwardly suspended chicane 56, which lies radially outside the outer surface of the separating tube 48, the lower edge of the chicane 56 lying underneath the upper edge of the separating tube 48.

The upper part 16 sits via an annular flat seal 58 tightly on a roof wall 60 of the main part 14, which has a central opening through which the separating tube 48 extends with a small degree of radial play.

The conducting body 44 is detachably and tightly carried by the circumferential wall 18 of the main part 14. Together with the upper section of the circumferential wall 18 it thus defines a water chamber 62, and the circumferential wall 18 has an overflow opening 64 at a level of somewhat more than half the height of the water chamber 62. An air discharge connection piece 66 displaced vertically somewhat (in practice 5-10 mm) above the overflow opening 64, but at 180° thereto in the circumferential direction, is provided in the circumferential wall 18. This air discharge connection piece is connected by a hose 68, shown by dotted lines, to the air inlet connection piece 32 of the centrifugal pump 28.

The protein separator described above operates in the following manner:

In stationary operation the centrifugal pump 28 sucks in aquarium water through the inlet connection piece 30 and air through the inlet connection piece 32. The mixture of water and foam discharged by the foam generator 24 is broken down in the main part 14 into the aqueous fractions and foam fractions. The aqueous fractions sink to the bottom and form the volume of water 34. The water in the discharge pipe 40 rises through the discharge angle piece 36, the deflection angle piece 38 and the discharge pipe 40 to the same level as the volume of water 34.

When the water has risen sufficiently far, it flows under the conveying pressure of the pump over the upper edge of the discharge pipe 40 and over the foam material sleeve 42 back again to the outer vessel 12.

In order to prevent the foam that the foam generator 24 feeds into the interior of the main part 14 from directly reaching the discharge angle piece 36, the direct connection between the open lower end of the discharge angle piece 36 and the foam discharge connection piece 22 is interrupted by a blocking wall 70.

The foam separated in the main part 14 moves upwardly in the main part 14 and is conveyed by the conducting body 44 to the lower end of the separating tube 48. A further separation of aqueous fractions takes place in the separating tube under the slow forward displacement of the foam. There separated water, which is often termed phase water, flows downwardly over the edge of the separating tube 48 and thus reaches the water chamber 62.

The dried foam is forced over the upper edge of the separating tube 48 into the interior of the upper part 16, which defines a foam collection chamber 72. The foam accumulating there is dry and contains only small amounts of water. It can thus be stored in a compact manner, and if the foam collapses further over the course of time, then only small amounts of water are produced.

In the water chamber 62 the phase water volume, identified by the reference numeral 74, reaches a level which, depending on the amount of foam occurring, lies at the lower edge or somewhat above the lower edge of the overflow opening 64. The foam generator 24 sucks in the air used for the foam generation through the overflow opening 64 and the air discharge opening 66.

If a larger volume of wet foam is fed to the separating tube 48 as a result of increased foam formation by the foam generator 24, then the amount of phase water discharged from the lower end of the separating tube 48 also increases. The overflow opening 64 is dimensioned so that it cannot rapidly discharge these additional amounts of water. The level of the volume of phase water thus rises above the lower edge of the overflow opening 64 and throttles the air stream sucked in through the latter.

In the event of an excessive foam generation the further formation of foam is thus automatically throttled by reducing the amount of air.

Figure 2:
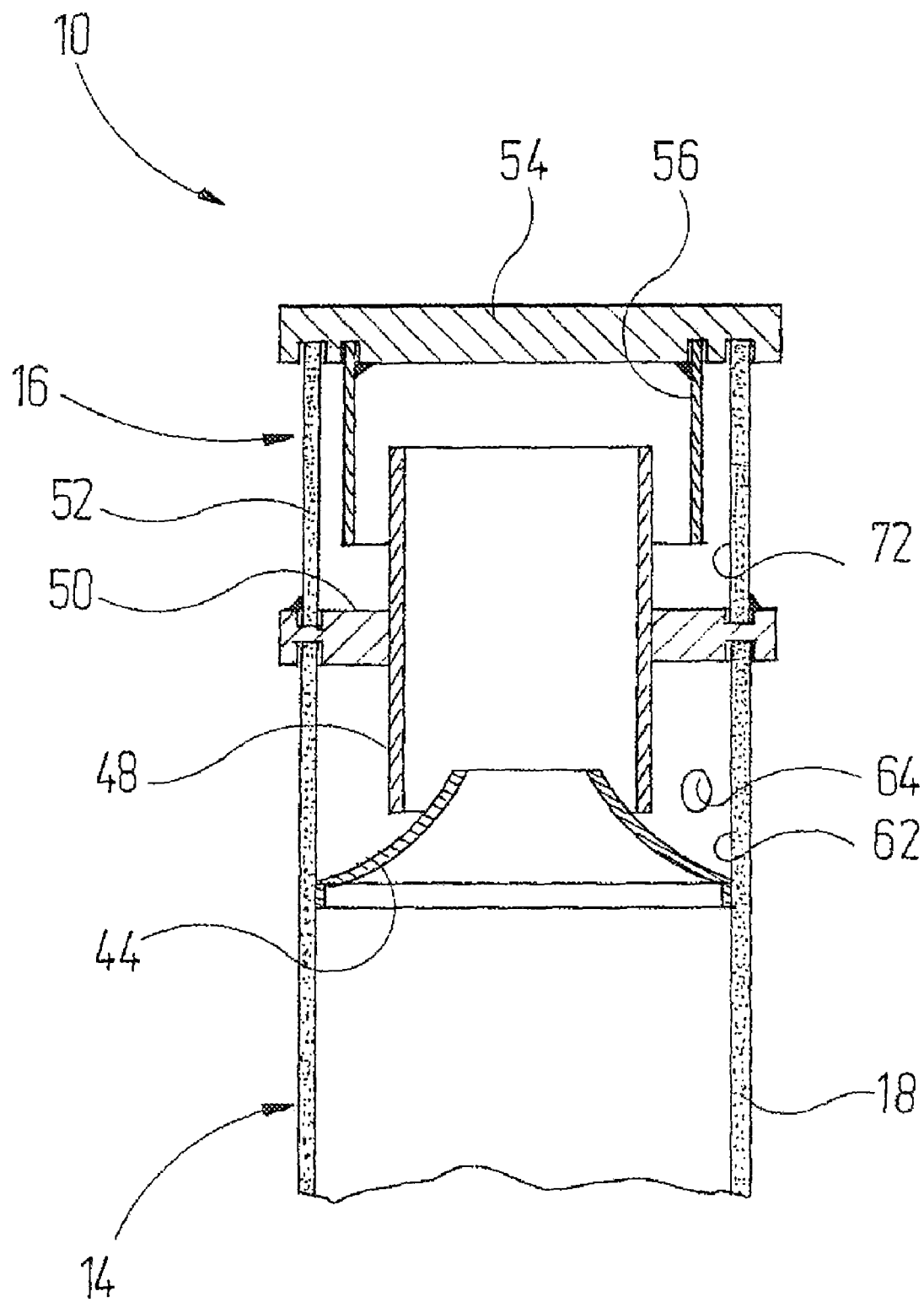
FIG. 2: is a similar view to FIG. 1, in which however only the upper section of a protein separator is illustrated, which differs as regards the geometry of a conducting body lying between the first separator and second separator; and, FIG. 3: is a similar view to FIG. 1, in which a further modified protein separator is shown, in which the air sucked in by the foam generator is additionally controlled depending on the foam level in the collection vessel.

The embodiment according to FIG. 2 differs from that according to FIG. 1 in that the roof wall 60 of the main part 14 is omitted and the floor wall 20 of the upper part 16 forms at the same time the upper boundary of the water chamber 62.

In addition the conducting body 44 seen in the axial sectional view is curved in such a way that the internal surface is concave.

Figure 3:
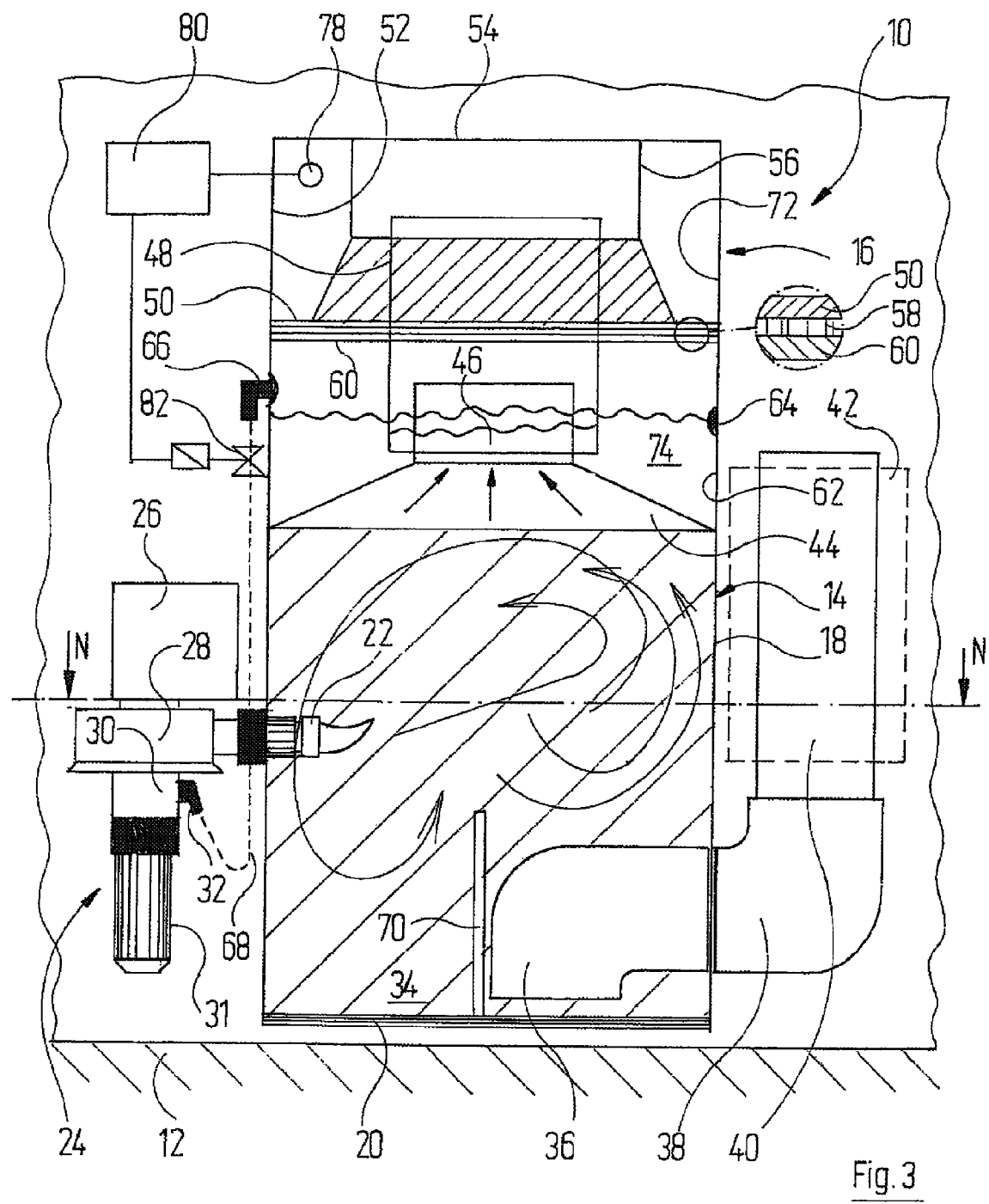

In the embodiment according to FIG. 3 a level sensor 78 is provided in the interior of the collection chamber 72, which responds when the foam contained therein reaches or exceeds a predetermined maximum level.

A magnetic valve 82 that is incorporated in the hose 68 is controlled via a control unit 80 through the output signal of the level sensor 78. The magnetic valve 82 is pretensioned in a spring-like manner in the open position, and is then closed when the level sensor 78 responds.

The protein separator according to FIG. 3 thus incorporates the regulation arrangement already described above with reference to FIG. 1, which in addition is backed up by a safety feature, namely the complete interruption of the supply of air to the foam generator 24 in the event that the foam level in the collection chamber 72 rises unallowably high.

By way of variation the magnetic valve 82 may be a proportional magnetic valve and the level sensor 78 can continuously measure the foam level in the collection chamber 72.

In another modified embodiment the control of the air feed to the foam generator 24 can also be effected exclusively by use of the level sensor 78 arranged in the collection chamber 72.

In a still further modified embodiment a level sensor can be arranged in the water chamber 62, which controls a magnetic valve 82 via which the foam generator 24 aspirates directly from the surroundings.

The various parts of the protein separator described above are made of a corrosion-resistant and smooth plastics material, and in order to be able to properly clean the various parts, they are preferably detachably connected to one another.

It should be emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the scope of this disclosure and the present invention, and protected by the following claims.

The invention claimed is:

1. A protein separator for aquaria, comprising: a foam generator, which sucks in aquarium water and air and generates a water/ air mixture; a first separator, which receives the water/air mixture at an inlet and breaks this down into a foam component, which is discharged at a foam outlet, and into an aqueous component, which is discharged at a water outlet, a foam collection vessel, which comprises an inlet connected to the foam outlet of the separator, wherein a foam generation rate sensor and an air control device are provided, the latter controlling the amount of air sucked in by the foam generator depending on output signal of the foam generation rate sensor.

2. The protein separator of claim 1, wherein a direct flow connection between the water outlet and the mixture inlet of the first separator is interrupted by a separating device.

3. The protein separator of claim 1, wherein a vertical outlet part of the first separator is at a height that is above the normal level (N) of the surrounding water.

4. The protein separator of claim 3, wherein the outside of the vertical outlet part carries a foam material sleeve.

5. A protein separator for aquaria, comprising:
a foam generator, which sucks in aquarium water and air and generates a water/ air mixture;
a first separator, which receives the water/air mixture at an inlet and breaks this down into a foam component, which is discharged at a foam outlet, and into an aqueous component, which is discharged at a water outlet, a foam collection vessel, which comprises an inlet connected to the foam outlet of the separator, wherein a foam generation rate sensor and an air control device are provided, the latter controlling the amount of air sucked in by the foam generator depending on output signal of the the foam generation rate sensor;
wherein between the foam inlet of the collection vessel and the foam outlet of the separator a second separator is provided, which is in communication with a water collection chamber, and that the air control device operates depending on the level of the volume of water contained in the water collection chamber; and,
wherein the water collection chamber comprises an overflow opening, and forms a passage opening for air sucked in by the foam generator.

6. The protein separator of claim 5, wherein the overflow opening has a diameter that is chosen having regard to the air and/or water conveying output of a pump of the foam generator, and having regard to the capacity of the collection vessel.

7. The protein separator of claim 6, wherein the overflow opening is arranged at a vertical position that lies above the upper edge of a water outlet part of the first separator.

8. The protein separator of claim 6, characterised in that the overflow opening lies lower than the upper edge of a conducting body, via which foam is introduced from the first separator into the second separator.

9. The protein separator of claim 6, wherein an air discharge opening of the water collection chamber is arranged above the overflow opening.

10. A protein separator for aquaria, comprising:
a foam generator, which sucks in aquarium water and air and generates a water/ air mixture;
a first separator, which receives the water/air mixture at an inlet and breaks this down into a foam component, which is discharged at a foam outlet, and into an aqueous component, which is discharged at a water outlet, a foam collection vessel, which comprises an inlet connected to the foam outlet of the separator, wherein a foam generation rate sensor and an air control device are provided, the latter controlling the amount of air sucked in by the foam generator depending on output signal of the the foam generation rate sensor; and,
wherein said foam generation rate sensor comprising a level sensor provided in the collection vessel or in a water chamber of a second separator connected downstream of the first separator, and the air control device operates depending on the output signal of this level sensor.

11. A protein separator for aquaria, comprising:
a foam generator, which sucks in aquarium water and air and generates a water/ air mixture;
a first separator, which receives the water/air mixture at an inlet and breaks this down into a foam component, which is discharged at a foam outlet, and into an aqueous component, which is discharged at a water outlet, a foam collection vessel, which comprises an inlet connected to the foam outlet of the separator, wherein a foam generation rate sensor and an air control device are provided, the latter controlling the amount of air sucked in by the foam generator depending on output signal of the the foam generation rate sensor; and,
wherein between the foam inlet of the collection vessel and the foam outlet of the separator a second separator is provided, which is in communication with a water collection chamber, and that the air control device operates depending on the level of the volume of water contained in the water collection chamber;
wherein the second separator has a tubular part of constant cross section, which extends from an upper section of the first separator into the interior of the collection vessel and wherein the tubular part is cylindrical and, wherein at the lower end of the tubular part there is provided a conducting body that tapers, in the direction from the first separator to the second separator; and,
wherein the tubular part terminates at an axial distance above the conducting body that is small compared to the mean diameter of the tubular part and is comparable to the radial distance between the tubular part and the upper end of the conducting body.

12. The protein separator of claim 11, wherein the axial distance between the conducting body and the tubular part is about 1-2 mm.

13. A protein separator for aquaria, comprising:
a foam generator, which sucks in aquarium water and air and generates a water/ air mixture;
a first separator, which receives the water/air mixture at an inlet and breaks this down into a foam component, which is discharged at a foam outlet, and into an aqueous component, which is discharged at a water outlet, a foam collection vessel, which comprises an inlet connected to the foam outlet of the separator, wherein a foam generation rate sensor and an air control device are provided, the latter controlling the amount of air sucked in by the foam generator depending on output signal of the the foam generation rate sensor; and,
wherein an adjustable servo-valve is arranged in the suction path of the foam generator, which valve is set, depending on the output signal of a level sensor arranged in a water collection chamber of a second separator connected downstream of the first separator, in such a way that the air throughput is reduced if the level rises, and is increased if the level falls.

* * * * *